United States Patent Office 2,774,672
Patented Dec. 18, 1956

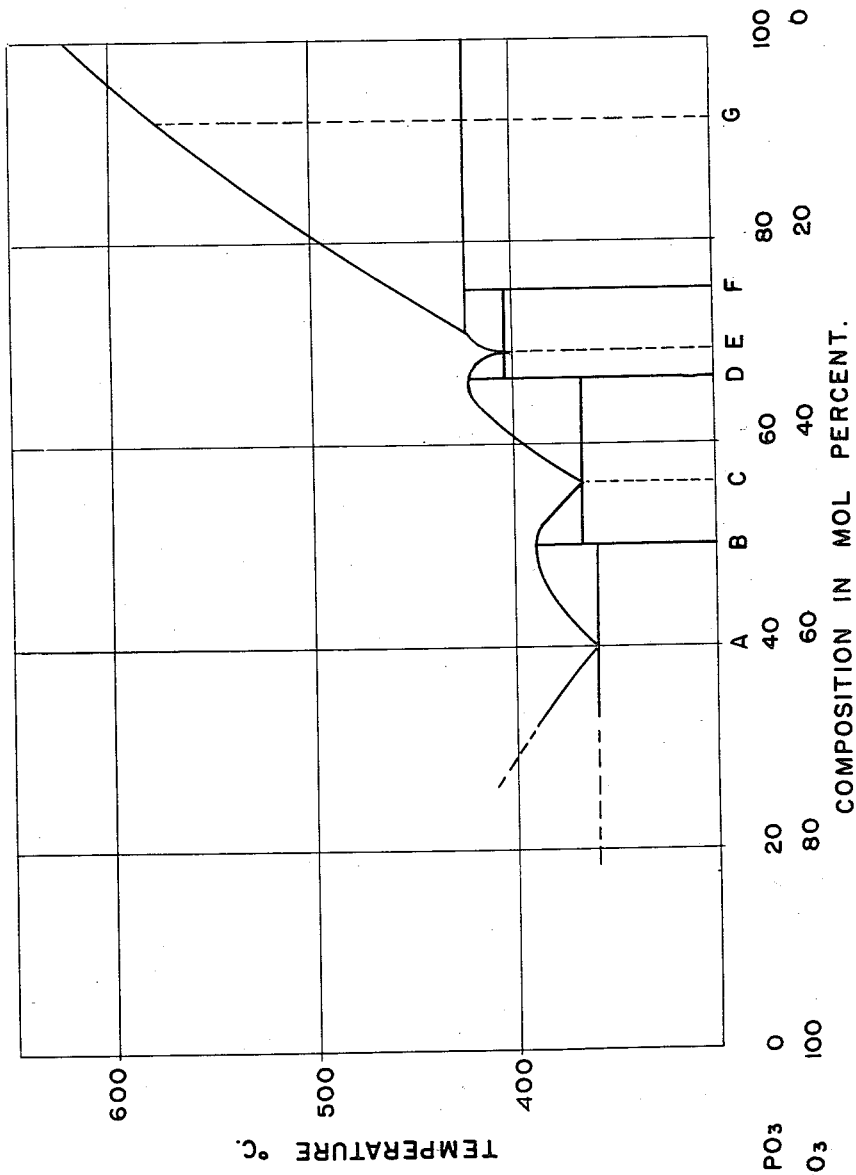

2,774,672

METAPHOSPHATE COMPOSITION

Edward J. Griffith, Dayton, Ohio, assignor to Monsanto Chemical Company, St. Louis, Mo., a corporation of Delaware Application March 18, 1955, Serial No. 495,317

13 Claims. (Cl. 99—95)

This invention relates to novel compounds and to novel compositions of matter. More specifically, the invention relates to novel phosphate compounds and compositions.

The compositions of the present invention are hydrogen metaphosphates of empirical formula $M_xH_y(PO_3)_{ax+y}$, wherein M is an ammonium radical or metal atom (preferably an alkali or alkaline earth metal, e. g., sodium, potassium or calcium), $x$ and $y$ are positive numbers, $a$ is the hydrogen equivalent of M, and $ax/y$ is between ½ and 9. While the precise structure of the materials is not definitely known, it is believed that they are cyclic polymeric materials, which can be designated by the formula $[M_xH_y(PO_3)_{ax+y}]_n$, wherein M, $a$, $x$, and $y$ are as defined above and $n$ is a relatively small positive integer—probably such that $n(ax+y)$ is equal to less than about ten. Examples of particularly useful specific compounds within the scope of the foregoing expression are sodium hydrogen metaphosphate, $[NaH(PO_3)_2]_n$, and disodium hydrogen metaphosphate $[Na_2H(PO_3)_3]_n$.

The foregoing metaphosphate compositions can be prepared by several methods. Typical methods are, for example: (1) by heating sodium dihydrogen ortho-phosphate monohydrate and orthophosphoric acid at a temperature above the melting point of the composition, maintaining at the elevated temperature for a sufficient length of time to drive off the appropriate amount of water, and then cooling to obtain the desired solid composition; (2) by heating sodium dihydrogen ortho-phosphate monohydrate and phosphorus pentoxide to a temperature above the melting point of the composition, maintaining this elevated temperature for a sufficient length of time to drive off the appropriate amount of water, and then cooling to obtain the desired solid composition; (3) by heating sodium pentahydrogen orthophosphate (sodium hemi-orthophosphate), to above its melting point to drive off water and then cooling to obtain sodium hydrogen metaphosphate; (4) by heating sodium carbonate and phosphorus pentoxide to a temperature above the melting point of the composition and in the presence of moisture, and then cooling to obtain the desired solid metaphosphate composition.

In those reactions (e. g., reactions 1, 2 and 4, above) in which the phosphorus and alkali or alkaline earth metal are introduced in separate reactants, the proportions of such reactants can be varied to give any of the metaphosphate compositions within the range of the present invention. Depending upon the particular proportions chosen, the product may be a distinct compound, a eutectic mixture of compounds, or a mixture of a compound with a eutectic mixture.

A better understanding of the character of the various compositions of the present invention can be gained by reference to the drawing, which is a diagram of phase transition temperatures as a function of composition (expressed in terms of mole proportions of $HPO_3$ and $NaPO_3$) for the sodium hydrogen metaphosphate system. From this phase diagram it can be seen that when sodium and hydrogen ($NaPO_3$ and $HPO_3$) are present in equimolar proportions, a compound is formed. This is the compound $[NaH(PO_3)_2]_n$, (probably $Na_2H_2(PO_3)_4$). At the composition indicated by point D, which contains sodium and hydrogen in the atomic proportions of 2 to 1, another compound, $[Na_2H(PO_3)_3]_n$, is formed. At the compositions indicated by A, C, and E, constant melting point eutectic mixtures are formed. At the composition indicated by point F, which contains sodium and hydrogen in the atomic proportions of 3 to 1, the compound, $[Na_3H(PO_3)_4]_n$, is formed. This compound melts incongruently at the peritectic temperature (about 420° C.). The compositions of proportions other than A, B, C, D, E and F will be mixtures of the various compounds and eutectics.

The compositions of the present invention can be obtained either as glassy materials or as crystalline materials, or as mixtures of crystalline material in a glassy matrix. The ease with which the various forms can be obtained varies considerably with such factors as rate of cooling, composition, etc. For example, it has been found much more difficult to obtain crystalline solids having lower than a 1:1 atomic ratio of sodium to hydrogen. On the other hand, compositions of equimolar proportions of $NaPO_3$ and $HPO_3$ can be quite readily crystallized by reasonably slow cooling. Where crystallization is desired, it is often quite helpful to seed a slightly supercooled melt with previously obtained crystalline material of approximately the same composition.

For purposes of simplicity, the foregoing description has been set forth with particular emphasis upon metaphosphate compositions in which the metal was sodium. It should be understood, however, that ammonium and other metal cations, or mixtures thereof, can be utilized to give similar products. Of particular interest among the other metal cations are the polyvalent metals, such as aluminum, nickle, iron, cobalt, chromium, titanium, etc., the alkaline earth metals, e. g., calcium strontium, barium, etc., and other alkali metals, e. g., lithium, potassium, etc. These latter products can be formed by substituting the analogous metal-containing reactants for the sodium-containing reactants in the reactions described above. Alternatively, the sodium acid metaphosphate products can be converted by well-known ion exchange techniques to the other metal or ammonium acid metaphosphates.

The following examples will serve to illustrate various methods by which the compositions of the present invention can be prepared:

EXAMPLE 1

Sodium hydrogen metaphosphate, $[NaH(PO_3)_2]_n$, was prepared by mixing 138 g. of monosodium dihydrogen ortho-phosphate monohydrate and 108 g. of a solution (85 weight percent) of phosphoric acid in a platinum dish and stirring until a mollescent mass was obtained. The mixture was then placed in a furnace at 200° C. and maintained there (for about 1½ hours) until water no longer boiled from the mixture and the mixture had become a clear liquid. The temperature of the furnace was then raised to 400° C. and held there (for about 1 hour) until water no longer boiled from the mixture. The furnace temperature was then lowered to about 365° C. and maintained there for about 4 days while the liquid solidified. The preparation was withdrawn from the furnace and allowed to cool to room temperature.

The product was a white non-hygroscopic crystalline solid, and slowly soluble in cold water. The analyses are given in Table I.

Table I
ANALYSES OF PRODUCT OF EXAMPLE 1

| Constituent | Calc., as NaH(PO₃)₂, Wt. Percent | Found, Wt. Percent |
|---|---|---|
| $P_2O_5$ | 78.0 | 78.1 |
| $H_2O$ | 4.9 | 4.9 |
| $Na_2O$ (by diff.) | 17.1 | 17.0 |

EXAMPLE 2

Sodium hydrogen metaphosphate $[NaH(PO_3)_2]_n$, was prepared by mixing 138 g. of monosodium dihydrogen ortho-phosphate monohydrate and 71 g. of dry phosphorus pentoxide in a platinum dish and placing in an oven at 200° C. (for about 6 or 7 hours) until a clear melt was obtained. The temperature was then raised to about 400° C. and held for 1 hour, and then dropped to about 300° C. and held for about 2 days. During the latter time the melt changed to a crystalline solid. The crystalline solid had the same physical characteristics as the product of Example 1. Analyses are presented in Table II.

Table II
ANALYSES OF PRODUCT OF EXAMPLE 2

| Constituent | Calc., as NaH(PO₃)₂, Wt. Percent | Found, Wt. Percent |
|---|---|---|
| $P_2O_5$ | 78.0 | 76.9 |
| $H_2O$ | 4.9 | 5.3 |
| $Na_2O$ | 17.1 | 17.3 |

EXAMPLE 3

Sodium hydrogen metaphosphate $[NaH(PO_3)_2]_n$, was prepared by heating 218 g. of sodium hemi-ortho-phosphate, $NaH_5(PO_4)_2$, in a platinum crucible to 200° C. and holding (for about 1½ hours) until water stopped boiling therefrom and a clear liquid melt was obtained. The temperature was then raised to 360° C. and held for about 2 days, while additional water was evolved and the product solidified. The solid product, having the same characteristics as the product obtained according to Examples 1 and 2.

EXAMPLE 4

Sodium hydrogen metaphosphate $[NaH(PO_3)_2]_n$, was prepared by mixing 124 g. of sodium carbonate monohydrate and 142 g. of dry phosphorus pentoxide in a platinum crucible and heating slowly (over the course of about 1 hour) to 200° C. and holding (for about 1 hour) until the evolution of carbon dioxide had stopped. The temperature was then raised to about 360° C. and held for 2 days, during which time solid crystalline sodium hydrogen metaphosphate was formed.

EXAMPLE 5

Sodium hydrogen metaphosphate $[NaH(PO_3)_2]_n$, was prepared by mixing 138 g. of sodium dihydrogen ortho-phosphate monohydrate and 108 g. of a solution (85 weight percent) of phosphoric acid were dissolved at room temperature in 60 g. of water in a platinum crucible. The solution was then heated to about 90° C. to evaporate water. As the solution became more concentrated, the temperature was raised to keep the solution molten. After about 1½ hours the temperature had been raised to about 400° C., and it was held at that point for about 1½ hours until the melt had stopped boiling. The temperature was then dropped to about 360° C. and held for 2 days, during which time sodium hydrogen metaphosphate was crystallized from the melt. Analyses are presented in Table III.

Table III
ANALYSES OF PRODUCT OF EXAMPLE 5

| Constituent | Calc., as NaH(PO₃)₂, Wt. Percent | Found, Wt. Percent |
|---|---|---|
| $P_2O_5$ | 78.0 | 78.2 |
| $H_2O$ | 4.9 | 5.9 |
| $Na_2O$ | 17.1 | 17.3 |

X-ray defraction data for this compound appear in table VIII.

EXAMPLE 6

A metaphosphate composition corresponding approximately to the eutectic composition A of the drawing was prepared by dissolving 69 g. of sodium dihydrogen ortho-phosphate monohydrate in 115 g. of a solution (85 weight percent) of phosphoric acid in a platinum crucible. The water was boiled off (in the manner described in Example 5), while slowly raising the temperature to about 400° C. over a period of about 2 hours. The temperature was held at 400° C. (for about 1½ hours) until boiling had ceased. The melt was then cooled to 365° C. and held for about 2 days to obtain the solid product.

EXAMPLE 7

A metaphosphate composition corresponding approximately to the eutectic composition C of the drawing was prepared by dissolving 187 g. of sodium dihydrogen ortho-phosphate monohydrate in 115 g. of a solution (85 weight percent) of phosphoric acid in a platinum crucible. The water was boiled off (in the manner described in Example 5), while slowly raising the temperature to about 275° C. over a period of 1 hour. The temperature was held at 400° C. (for about 1 hour) until boiling had ceased. The melt was then cooled to 365° C. and held for about 2 days to obtain the solid product. Analyses are presented in Table IV.

Table IV
ANALYSES OF PRODUCT OF EXAMPLE 7

| Constituent | Calculated, Wt. Percent | Found, Wt. Percent |
|---|---|---|
| $P_2O_5$ | 76.8 | 76.8 |
| $H_2O$ | 4.3 | 5.5 |
| $Na_2O$ | 18.9 | 17.7 |

EXAMPLE 8

A metaphosphate composition corresponding approximately to the eutectic composition E of the drawing was prepared by mixing 33.5 g. of a composition $$[Na_5H_2(PO_3)_7]_n$$

and 0.28 g. of $(NaPO_3)_3$. The mixture was heated to 600° C. and held for about ½ hour, then reduced to 380° C. and held for 1 day. The crystalline product analyzed as follows:

Table V
ANALYSES OF PRODUCT OF EXAMPLE 8

| Constituent | Calculated, Wt., Percent | Found, Wt. Percent |
|---|---|---|
| $P_2O_5$ | 74.5 | 74.4 |
| $H_2O$ | 3.0 | 3.3 |
| $Na_2O$ | 22.5 | 23.3 |

EXAMPLE 9

A metaphosphate composition corresponding approximately to the composition G of the drawing was prepared by dissolving 276 g. of sodium dihydrogen ortho-phosphate monohydrate and 34.6 g. of a solution (85 weight percent) of phosphoric acid in ca. 30 g. of water in a platinum crucible. The water was boiled off (in the manner described in Example 5) while slowly raising the temperature to about 500° C. over a period of (ca.) 2 hours. The temperature was held at 500° C. (for about ½ hour) until boiling had ceased. The melt was then cooled to 400° C. and held for 1 day to obtain the solid product.

EXAMPLE 10

Disodium monohydrogen metaphosphate

[Na$_2$H(PO$_3$)$_3$]$_n$—I (soluble form) was prepared by mixing 276 g. of NaH$_2$PO$_4$.H$_2$O and 115 g. of 85 percent orthophosphoric acid in a platinum dish and adding 50 ml. of water to form a clear homogeneous solution. The dish was placed in a cool muffle furnace. The furnace temperature was increased to 600° C. over a period of 1 hour, maintained at that temperature for another hour. The temperature was then lowered to 300° C. and held for about 15 hours, during which time the desired product crystallized without further treatment. The product was a white, non-hygroscopic water-soluble crystalline compound melting at about 420° C. and analyzing as follows:

Table VI
ANALYSES OF PRODUCT OF EXAMPLE 10

| Constituent | Calc., as Na$_2$H(PO$_3$)$_3$, Wt. Percent | Found, Wt. Percent |
|---|---|---|
| P$_2$O$_5$ | 75.0 | 75.4 |
| H$_2$O | 3.2 | 3.6 |
| Na$_2$O | 21.8 | 21.0 |

The characteristic X-ray diffraction data are presented in Table VIII.

EXAMPLE 11

Disodium monohydrogen metaphosphate

[Na$_2$H(PO$_3$)$_3$]$_n$—II (insoluble form) was prepared in the case manner as the soluble form (Example 10, above), except that the melt was allowed to crystallize at temperatures above 380° C. This second form of the compound is a water-insoluble crystalline solid analyzing as follows:

Table VII
ANALYSES OF PRODUCT OF EXAMPLE 11

| Constituent | Calc., as Na$_2$H(PO$_3$)$_3$, Wt. Percent | Found, Wt. Percent |
|---|---|---|
| P$_2$O$_5$ | 75.0 | 75.2 |
| H$_2$O | 3.2 | 3.5 |
| Na$_2$O | 21.8 | 21.3 |

The characteristic X-ray diffraction data are presented in Table VIII.

EXAMPLE 12

Trisodium hydrogen metaphosphate [Na$_3$H(PO$_3$)$_4$]$_n$, was prepared by mixing 138 g. of NaH$_2$PO$_4$.H$_2$O and 38.4 g. of 85 percent H$_3$PO$_4$ in a platinum dish. The mixture was heated to 600° C. over the course of one hour, and then allowed to cool to 350° C.

Table VIII
X-RAY DIFFRACTION DATA

| NaH(PO$_3$)$_2$ | | Na$_2$H(PO$_3$)$_3$—I | | Na$_2$H(PO$_3$)$_3$—II |
|---|---|---|---|---|
| Interplanar Spacing, in A. | Relative Intensity | Interplanar Spacing, in A. | Relative Intensity | Interplanar Spacing, in A. |
| 5.75 | 16 | 6.19 | 28 | 7.053 |
| 4.44 | 23 | 5.43 | 18 | 5.262 |
| 4.33 | 26 | 5.01 | 83 | 5.025 |
| 3.93 | 49 | 4.40 | 6 | 4.732 |
| 3.67 | 15 | 3.88 | 18 | 4.396 |
| 3.41 | 11 | 3.82 | 28 | 3.867 |
| 3.39 | 10 | 3.77 | 36 | 3.746 |
| 3.28 | 8 | 3.59 | 37 | 3.527 |
| 3.16 | 20 | 3.47 | 22 | 3.376 |
| 3.05 | 100 | 3.38 | 23 | 3.255 |
| 2.90 | 4 | 3.27 | 20 | 3.137 |
| 2.63 | 6 | 3.21 | 100 | 3.074 |
| 2.44 | 7 | 3.11 | 88 | 2.998 |
| 2.34 | 18 | 2.90 | 57 | 2.969 |
| 2.22 | 3 | 2.70 | 6 | 2.849 |
| 2.17 | 5 | 2.61 | 14 | 2.788 |
| 1.96 | 2 | 2.51 | 19 | 2.640 |
| 1.92 | 2 | 2.45 | 10 | 2.498 |
| 1.88 | 2 | 2.43 | 9 | 2.411 |
| 1.85 | 5 | 2.39 | 8 | 2.395 |
| 1.83 | 4 | 2.32 | 10 | 2.356 |
| 1.81 | 3 | 2.24 | 9 | 2.281 |
| | | 2.00 | 6 | 2.238 |
| | | 1.94 | 14 | 2.230 |
| | | | | 2.181 |
| | | | | 2.090 |
| | | | | 2.042 |
| | | | | 1.996 |
| | | | | 1.953 |
| | | | | 1.914 |
| | | | | 1.967 |
| | | | | 1.836 |
| | | | | 1.809 |
| | | | | 1.791 |
| | | | | 1.766 |
| | | | | 1.740 |
| | | | | 1.702 |
| | | | | 1.675 |

The melt crystallized at this temperature within about twelve hours. The desired compound, an insoluble crystalline compound melting incongruently at 420° C., was freed of glassy material by washing with distilled water. The compound analyzed as follows:

Table IX
ANALYSES OF PRODUCT OF EXAMPLE 12

| Constituent | Calc., as Na$_3$H(PO$_3$)$_3$, Wt. Percent | Found, Wt. Percent |
|---|---|---|
| P$_2$O$_5$ | 73.6 | 73.6 |
| H$_2$O | 2.3 | 2.3 |
| Na$_2$O | 24.1 | 24.1 |

EXAMPLE 13

An aluminum acid metaphosphate was prepared by mixing 34.9 g. of AlPO$_4$ and 230 g. 85 percent orthophosphoric acid and heating at 320° C. for two hours. Upon lowering the temperature to 200° C. and holding overnight, the desired product, a white crystalline solid, crystallized from the melt.

Many of the compositions of the present invention, and especially the alkali and alkaline earth metal hydrogen metaphosphate, are particularly effective as leavening acids in leavening compositions for use in baking cakes, biscuits, waffles, doughnuts, and the like. The present compositions can be utilized either by themselves (as the sole leavening acid in a baking preparation), or in conjunction with other leavening acids, such as monocalcium ortho-phosphate or sodium acid pyrophosphate.

The purpose of a leavening acid is to react with a second material, e. g., sodium bicarbonate, to release a leavening gas, such as carbon dioxide, during the mixing and baking of doughs, thereby causing the dough to "rise." The effectiveness of a leavening composition is determined largely by the total quantity of gas given off per unit quantity of leavening agent, and by the conditions under which the gas is released.

For example, leavening action, i. e., the release of leavening gas, is primarily desired during two periods—first, in the initial phases of dough preparation, and second, while the dough is being baked. The presently used leavening acids, are generally quite unsatisfactory from the point of view of release of leavening gas during both of these periods. These latter materials cause the evolution of gas continuously from the time of first mixing the dry ingredients with moisture until substantially all of the leavening gas has been released. The overall rate of evolution of leavening gas can be slowed down in order to save more for the baking period, but this advantage may be attained only at the expense of decreased leavening action during the mixing period.

The compositions of the present invention are outstanding leavening acids in that they not only cause a substantial release of carbon dioxide during the initial mixing period, but they also retain a substantial leavening capacity until such time as the temperature of the dough is elevated, such as during baking. This highly desirable dual stage leavening action (i. e., first during mixing and then during baking) is believed to result from the fact that the reaction of the leavening acid with sodium bicarbonate can take place in two different ways.

The first way is by a neutralization reaction between the present metaphosphates and sodium bicarbonate. For example, with sodium acid metaphosphate $[NaH(PO_3)_2]_n$, the reaction can be indicated as follows:

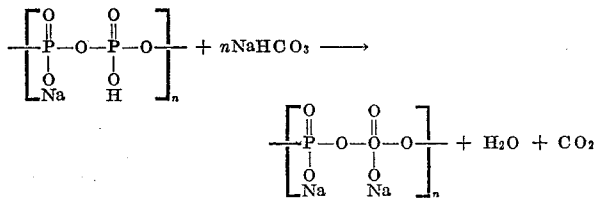

The second way in which the present leavening acids can react with sodium bicarbonate to release $CO_2$ is by hydrolysis of the acid metaphosphate (or the neutralization products thereof) to form orthophosphoric acid and/or monosodium ortho-phosphate with the subsequent reaction of the orthophosphoric acid or monosodium ortho-phosphate with sodium bicarbonate to release carbon dioxide. These reactions can be indicated as follows:

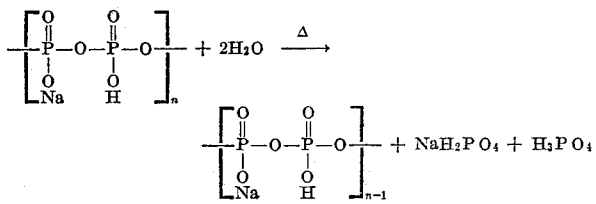

or

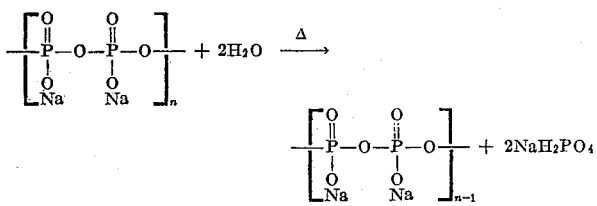

$$H_3PO_4 + NaHCO_3 \longrightarrow Na_2HPO_4 + 2H_2O + 2CO_2$$

and/or $$NaH_2PO_4 + NaHCO_3 \longrightarrow Na_2HPO_4 + H_2O + CO_2$$

The first type of leavening action, i. e., the neutralization, takes place readily at room temperatures and is believed to be the predominant mechanism whereby carbon dioxide is released. The second type of leavening action, i. e., the hydrolysis, takes place predominantly only at elevated temperatures, such as those obtained during baking.

The relative proportions of the present acid metaphosphates and sodium bicarbonate to be used in leavening compositions will depend somewhat upon the particular metaphosphate composition chosen; but in general the proportions will be such that the mixture of metaphosphate and bicarbonate will contain between about 25 weight percent and about 80 weight percent of metaphosphate and between about 20 weight percent and about 75 weight percent of bicarbonate. Preferred proportions comprise from about 40 weight percent to about 50 weight percent of metaphosphate and from about 50 weight percent to about 60 weight percent of bicarbonate.

The following examples serve to illustrate the outstanding utility of the compositions of the present invention when used in leavening compositions with sodium bicarbonate.

EXAMPLE 14

Metaphosphate compositions corresponding approximately to the empirical formulae, $Na_4H_3(PO_3)_7$, $Na_3H_2(PO_3)_5$, $Na_5H_2(PO_3)_7$, and $Na_8H(PO_3)_9$, were prepared and tested as leavening agents in a standardized biscuit baking test. The weight ratio of leavening acid to sodium bicarbonate in each case was 1.43, 2.0, 2.5 and 2.85, respectively. Each of the metaphosphates gave a very definite leavening action, the first two (i. e., $Na_4H_3(PO_3)_7$, and $Na_3H_2(PO_3)_5$, being particularly effective—especially with respect to lightness and volume of biscuit.

EXAMPLE 15

Comparison with sodium acid pyrophosphate in standard cake baking test.

Two white cakes were baked under identical conditions except that in one the leavening acid was sodium hydrogen metaphosphate whereas in the other the leavening acid was sodium acid pyrophosphate. The cakes were then compared with respect to symmetry, volume, tenderness, texture, color and flavor. The cake baked with the sodium hydrogen metaphosphate was as good or better than the cake baked with sodium acid pyrophosphate with respect to each of the foregoing characteristics.

Various acid metaphosphates of this invention are also useful for other purposes. For example, some of the insoluble compounds may be used as dental polishing or abrasive agents, particularly in dentifrice compositions. Others are useful as anti-caking agents when added to materials such as sugar, etc.

The acid metaphosphates are also useful in the preparation of novel mixed metaphosphate salts of the type $M_xM'_y(PO_3)_{ax+y}$, wherein M, a, x, and y are as defined above and M' is a different member selected from the same group as M. For example, $Na_2(NH_4)_2(PO_3)_4$, a white crystalline water-soluble solid, was prepared by dissolving 20 grams of $Na_2H_2(PO_3)_4$ in about 100 ml. of water containing twice the stoichiometric amount of $NH_4OH$ required to neutralize the acid phosphate, and precipitating the mixed salt by addition of methanol. The mixed salts $CaNa_2(PO_3)_4$ and $K_2Na_2(PO_3)_4$ were made in the same way, using CaO and KOH.

This application is a continuation-in-part of my earlier-filed copending application Serial No. 398,952, filed December 18, 1953.

I claim:

1. A hydrogen metaphosphate composition having the empirical formula $M_xH_y(PO_3)_{ax+y}$, wherein M is a member selected from the group consisting of an ammonium radical and metal atoms, $x$ and $y$ are positive members, $a$ is the hydrogen equivalent of M, and $ax/y$ is between ½ and 9.

2. A hydrogen metaphosphate composition having the empirical formula $M_xH_y(PO_3)_{ax+y}$, wherein M is an alkali metal, $x$ and $y$ equal positive numbers, $a$ equals the hydrogen equivalent of the metal M, and $ax/y$ is between ½ and 9.

3. A hydrogen metaphosphate composition having the empirical formula $Na_xH_y(PO_3)_{x+y}$, wherein $x$ and $y$ are positive numbers, and $x/y$ is between ½ and 9.

4. Sodium hydrogen metaphosphate.

5. Disodium monohydrogen metaphosphate.

6. Trisodium monohydrogen metaphosphate.

7. A leavening composition comprising sodium bicarbonate and a compound having the empirical formula, $M_xH_y(PO_3)_{ax+y}$, wherein M is an alkali metal, $x$ and $y$ are positive numbers, $a$ is the hydrogen equivalent of the metal M, and $ax/y$ is between ½ and 9.

8. A leavening composition comprising from 20 weight percent to 75 weight percent of sodium bicarbonate and from 25 weight percent to 80 weight percent of a metaphosphate having the empirical formula, $$Na_xH_y(PO_3)_{x+y}$$

wherein $x$ and $y$ are positive numbers and $x/y$ is between ½ and 9.

9. A leavening composition comprising from 20 weight percent to 75 weight percent of sodium bicarbonate and from 25 weight percent to 80 weight percent of sodium hydrogen metaphosphate.

10. A leavening composition comprising from 20 weight percent to 75 weight percent of sodium bicarbonate and from 25 weight percent to 80 percent of disodium monohydrogen metaphosphate.

11. A leavening composition comprising from 50 weight percent to 60 weight percent of sodium bicarbonate and from 40 weight percent to 50 weight percent of sodium hydrogen metaphosphate.

12. A hydrogen metaphosphate composition having the empirical formula $M_xH_y(PO_3)_{ax+y}$, wherein M is an alkaline earth metal, $x$ and $y$ equal positive numbers, $a$ equals the hydrogen equivalent of the metal M, and $ax/y$ is between ½ and 9.

13. A leavening composition comprising sodium bicarbonate and a compound having the empirical formula, $M_xH_y(PO_3)_{ax+y}$, wherein M is an alkaline earth metal, $x$ and $y$ are positive numbers, $a$ is the hydrogen equivalent of the metal M, and $ax/y$ is between ½ and 9.

No references cited.